(12) United States Patent
Crosby et al.

(10) Patent No.: US 7,978,416 B2
(45) Date of Patent: Jul. 12, 2011

(54) SURFACE BUCKLING METHOD AND ARTICLES FORMED THEREBY

(75) Inventors: Alfred J. Crosby, Amherst, MA (US); Edwin P. Chan, Montgomery Village, MD (US)

(73) Assignee: The University of Massachusetts, Boston, MA (US)

( * ) Notice: Subject to any disclaimer, the term of this patent is extended or adjusted under 35 U.S.C. 154(b) by 0 days.

(21) Appl. No.: 12/943,986

(22) Filed: Nov. 11, 2010

(65) Prior Publication Data
US 2011/0063732 A1  Mar. 17, 2011

Related U.S. Application Data

(62) Division of application No. 11/944,895, filed on Nov. 26, 2007, now Pat. No. 7,858,156.

(60) Provisional application No. 60/867,261, filed on Nov. 27, 2006.

(51) Int. Cl.
  *C08J 7/00* (2006.01)
  *C08J 7/12* (2006.01)
  *G02B 3/00* (2006.01)
  *G02B 3/08* (2006.01)

(52) U.S. Cl. ........ 359/642; 359/644; 359/741; 359/742; 427/510; 427/512; 427/515; 427/532; 522/121; 522/141; 522/148; 430/270.1; 430/281.1; 430/288.1

(58) Field of Classification Search .................. 427/510, 427/512, 515, 532; 430/270.1, 281.1, 288.1; 359/642, 644, 741, 742; 522/148, 121, 141
See application file for complete search history.

(56) References Cited

U.S. PATENT DOCUMENTS

| | | | |
|---|---|---|---|
| 5,286,338 A | 2/1994 | Feldblum et al. | |
| 5,599,624 A | 2/1997 | Prochazka | |
| 6,608,726 B2 * | 8/2003 | Legrand et al. | 359/392 |
| 6,740,366 B2 * | 5/2004 | Hori et al. | 427/515 |
| 6,836,384 B2 | 12/2004 | Legrand et al. | |
| 6,893,941 B2 | 5/2005 | Suda | |
| 6,987,258 B2 | 1/2006 | Mates | |
| 7,019,671 B2 | 3/2006 | Kawai | |
| 7,161,736 B2 | 1/2007 | Legrand et al. | |
| 7,195,733 B2 * | 3/2007 | Rogers et al. | 264/496 |

(Continued)

FOREIGN PATENT DOCUMENTS
WO   01/49776 A2   7/2001

OTHER PUBLICATIONS

Chan et al, "Fabricating microlens arrays by surface wrinkling", Advanced Materials, vol. 18, pp. 3238-3242, Dec. 2006.*

(Continued)

*Primary Examiner* — Susan W Berman
(74) *Attorney, Agent, or Firm* — Cantor Colburn LLP

(57) ABSTRACT

A method for generating spontaneously aligned surface wrinkles utilizes control of local moduli-mismatch and osmotic pressure. The method includes modifying the surface of an elastomeric layer to form a superlayer that is stiffer and/or less absorbent than the elastomeric layer. The elastomeric layer is then swollen with a polymerizable monomer, which causes buckling of the superlayer. The monomer is then polymerized, dimensionally stabilizing the surface buckling. The buckled surfaces generated by the method are useful in a wide variety of end-use applications, including microlenses, microlens arrays, compound microlenses, diffraction gratings, photonic crystals, smart adhesives, mechanical strain sensors, microfluidic devices, and cell culture surfaces.

10 Claims, 9 Drawing Sheets

U.S. PATENT DOCUMENTS

| | | | |
|---|---|---|---|
| 7,251,292 B2 | 7/2007 | Kandiar | |
| 7,335,271 B2 | 2/2008 | Autumn | |
| 7,344,825 B2* | 3/2008 | Nagai et al. | 430/316 |
| 7,521,292 B2* | 4/2009 | Rogers et al. | 438/118 |
| 7,622,367 B1 | 11/2009 | Nuzzo et al. | |
| 7,625,598 B2* | 12/2009 | Sharma et al. | 427/162 |
| 2005/0069676 A1 | 3/2005 | Nakamura et al. | |
| 2005/0196068 A1 | 9/2005 | Kawai | |
| 2005/0208432 A1 | 9/2005 | Conley, Jr. et al. | |
| 2006/0236721 A1 | 10/2006 | Franck | |
| 2009/0297776 A1 | 12/2009 | Crosby et al. | |

OTHER PUBLICATIONS

Chua et al, "Spontaneous formation of complex and ordered structures on oxygen-plasma-treated elastomeric polydimethylsiloxane", Applied Physics Letters, vol. 76, No. 6, Feb. 2000.*

Efimenko et al, "Surface Modification of Sylgard-184 Poly(dimethyl siloxane) Networks by Ultraviolet and Ultraviolet/Ozone Treatment", Journal of Colloid and Interface Science 254, pp. 306-315 (2002).*

U.S. Appl. No. 12/464,306 Non-Final Office Action dated Jan. 21, 2011; 8 pages.

Chan ("Adhesion of patterned polymer interfaces" (Sep. 1, 2007). Electronic Doctoral Dissertations for UMASS Amherst. paper AAI3289211).

U.S. Appl. No. 12/464,306 Final Office Action dated Mar. 9, 2011; 8 pages.

U.S. Appl. No. 12/464,306 Non-Final Office Action dated: Sep. 13, 2010, 16 pages.

U.S. Appl. No. 12/464,306 Restriction Requirement dated: Aug. 25, 2010, 6 pages.

Peng et al., Optics Letters 2002, 27, 1720.

Riise et al., Rheology and Shear-Induced Alignment of Lamellar Diblock and Triblock Copolymer, Macromolecules 1996, 28, 7653-7659, Abstract 1 page.

Thomas et al., Controlling Adhesion with Surface Hole Patterns, The Journal of Adhesion 82: 311-329, 2006.

Autumn et al., Evidence for van der Waals adhesion in gecko setae, Proceedings of the Natonal Academy of Sciences, 2002, vol. 99, No. 19, pp. 12252-12256, Abstract 2 pages.

Gorb, Attachment devices of insect cuticle, 2001, Dordrecht: Kluwer Academic Publishers, p. 305, Abstract 1 page.

Gorb et al., Biological micro and nanotribology: Nature's solutions, 2001, Berlin: Springer-Verlag, Book review 1 page.

Glassmaker et al., Design of Biomimetric fibrillar interfaces: 1. Making contact, Journal of the Royal Society Interface, 2004, vol. 1, No. 1, pp. 23-33.

Hui et al., Design of Biomimetric fibrillar interfaces: 2. Mechanics of enhanced adhesion, Journal of the Royal Society Interace, 2004, vol. 1, No. 1, pp. 35-48.

Kim et al., Biologically inspired polymer microfiber with spatulate tips as repeatable fibrillar adhesives, Applied Physics Letters, 2006, vol. 89, 26191.

Aksak et al., Adhesion of biologically inspired vertical and angled polymer microfiber arrays, Langmuir, 2007, vol. 23, No. 6, pp. 3322-3332.

Greiner et al., Adhesion of bioinspired micropatterned surfaces: Effects of pillar radius, aspect ratio and preload, Langmuir, 2007, vol. 23, No. 7, pp. 3995-3502.

Lamblet et al., Adhesion enhancement through micropatterning at polydimethylsiloxane-acrylic adhesive interaces, Langmuir, 2007, vol. 23, No. 13, pp. 6966-6974.

Jiang et al., Advanced Materials, 2006, vol. 18, pp. 1471-1475.

Chan et al., Advanced Materials, 2008, vol. 20, pp. 711-716.

Thesis of Edwin P. Chan, University of Massachusetts, Sep. 2007.

Schmidt et al., Formable compound micro-lens arrays, http://newsroom.spie.org/x4676.xml?ss=print, Nov. 8, 2006, 3 pages.

Holmes et al., http://meetings.aps.org/Meeting/MAR09/Event/95701, Mar. 16-20, 2009, Abstract, 1 page.

Chan et al., Fabricating microlens arrays by surface wrinkling, Advanced Materials, 2006, vol. 18, pp. 3238-3242.

E. Southern, A.G. Thomas, J. Polym. Sci., Part A: Polym. Chem. 1965, vol. 3, pp. 641 ff.

Toyoichi Tanaka, Shao-Tang Sun, Yoshitsugu Hirokawa, Seiji Katayama, John Kucera, Yoshiharu Hirose, Takayuki Amiya, "Mechanical instability of gels at the phase transition", Nature, vol. 325, Feb. 26, 1987, 796-798.

N. Bowden, S. Brittain, A.G. Evans, J.W. Hutchinson, G.W. Whitesides, "Spontaneous formation of ordered structures in thin films of metals supported on an elastomeric polymer", Nature 1998, vol. 393, p. 146.

K. Autumn, Y.A. Liang, S.T. Hsieh, W. Zesch, W.P. Chan, T.W. Kenny, R. Fearing, R.J. Full, "Adhesive force of a single gecko foot-hair" Nature 2000, vol. 405, p. 681.

W.T.S. Huck, N. Bowden, P. Onck, T. Pardoen, J.W. Hutchinson, G.W. Whitesides, "Ordering of Spontaneously Formed Buckles on Planar Surfaces", Languir 2000, vol. 16, p. 3497.

A. Jagota, S.J. Bennison, "Mechanics of Adhesion Through a Fibrillar Microstructure", Integr. Comp. Biol. 2002, vol. 42, p. 1140.

E. Cerda, L. Mahadevan, "Geometry and Physics of Wrinkling", Physical Review Letters 2003, vol. 9, 074302.

A.K. Geim, S.V. Dubonos, I.V. Grigorieva, K.S. Novoselov, A.A. Zhukov, S.Y. Shappoval, "Microfabricated adhesive mimicking gecko foot-hair" Nature Materials 2003, vol. 2, p. 461.

S.N. Gorb, E.V. Gorb, "Ontogenesis of the attachment ability in the bug *Coreus marginatus* (Heteropeter, Insecta)", The Journal of Experimental Biology 2004, vol. 207, p. 2917.

A.J. Crosby, M. Hageman, A. Duncan, "Controlling Polymer Adhesion with 'Pancakes'", Languir 2005, vol. 21, p. 11738-11743.

Rachel A. Segalman, "Patterning with block copolymer thin films", Materials Science and Engineering R: Reviews, 2005, vol. 48, pp. 191-226.

T. Sun, L. Feng, X. Gao, L. Jiang, "Bioinspired Surfaces with Special Wettability", Account of Chemical Research 2005, vol. 38, p. 644.

E.P. Chan, A.J. Crosby, Soft Matter 2006, vol. 2, pp. 324-328.

T. Thomas, A.J. Crosby, "Controlling Adhesion with Surface Hole Patters", Journal of Adhsion 2006, vol. 82, p. 311.

Dahl-Young Khang, Hanqing Jiang, Young Huang, John A. Rogers, "A Stretchable Form of Single-Crystal Silicon for High-Performance Electronics on Rubber Substrates", Science 2006, vol. 311, pp. 208-212.

Ki-Hun Jeong, Jaeyoun Kim, Luke P. Lee, "Biologically Inspired Artificial Compound Eyes", Science, 2006, vol. 312, pp. 557-561.

C. Harrison, C.M. Stafford, W. Zhang and A. Karim, Applied Physics Letters, 2004, vol. 85, pp. 4016-4018.

C.M. Stafford, C.M. Harrison, K.L. Beers, A. Karim, E.J. Amis, M.R. Vanlandingham, H.C. Kim, W. Volksen, R.D. Miller and E.E. Simonyi, Nature Materials, 2004, vol. 3, pp. 545-550.

D.B.H.Chua, H.T. Ng and S.F.Y. Li, Applied Physics Letters, 2000, vol. 76, pp. 721-723.

N. Bowden, W.T.S. Huck, K.E. Paula and G.W. Whitesides, Applied Physics Letters, 1999, vol. 75, pp. 2557-2559.

K. Efimenko, M. Rackaitis, E. Manias, A. Vaziri, L. Mahadevan and J. Genzer, Nature Materials, 2005, vol. 4 pp. 293-297.

S.J. Kwon, J.H. Park and J.G. Park, Physical Review E, 2005, vol. 71, pp. 11601-11604.

R.C. Hayward, B.F. Chmelka and E.J. Kramer, Macromolecules, 2005, vol. 38, pp. 7768-7783.

E.S. Matsuo and T. Tanaka, Nature, 1992, vol. 358, pp. 482-484.

K. Efimenko, W.E. Wallace and J. Genzer, Journal of Colloid and Interface Science, 2002, vol. 254, pp. 306-315.

B. Zhao and W.J. Brittain, Progress in Polymer Science, vol. 25, pp. 677-710.

Stephen G. Johnson, "Photonic Crystals: Periodic Surprises in Electromagnetism" (Apr. 2003).

S. Jeon, V. Malyarchuk, J.O. White and J.A. Rogers, Nano Letters, 2005, vol. 5, pp. 1351-1356.

C.D.W. Wilkinson, A.S.G. Curtis and J. Crossan, J. Vac. Sci. Technol. B, 1998, vol. 16, pp. 3132-3126.

M. Yamato, C. Konmo, M. Utsumi, A. Kikuchi and T. Okano, Biomaterials, 2002, vol. 23, pp. 561-567.

Luke P. Lee and Robert Szema "Inspirations from Biological Optics for Advanced Photonic Systems", Science, 2005, vol. 310, pp. 1148-1150.

H. Hillborg, N. Tomczak, A. Olah, H. Schonherr, and G.J. Vancso, Langmuir, 2004, vol. 20, pp. 785-794.
J. Groenewold, Physica A, 2001, vol. 298, pp. 32-45.
Z.L. Liau et al., Applied Physics Letters 1994, 64, 1484.
H.A. Biebuyck et al., Langmuir 1994, 10, 2790.
M.H. Wu et al., Langmuir 2002, 18, 9312.
E. Bonaccurso et al., Applied Physics Letters 2005, 86, 1.
T.J. Suleski and D.C. O'Shea, Applied Optics 1995, 34, 7507.
Q. Peng et al., Optics Letters 2002, 27, 1720.
S. Yang et al., Advanced Materials 2005, 17, 435.
R. Yang et al., Applied Physics Letters 2005, 86, 161110.
H. Yabu and M. Shimomura, Langmuir 2005, 21, 1709.
M.V. Kunnavakkam et al., Applied Physics Letters 2003, 82, 1152.
H.G. Allen, Analysis and Design of Structural Sandwich Panels, Pergamon Press, Oxford 1969.
J. Pyun, T. Kowalewski, and K. Matyjaszewski, Macromolecular Rapid Communications 2003, vol. 24, pp. 1043-1059.

* cited by examiner

SURFACE BUCKLING METHOD AND ARTICLES FORMED THEREBY

CROSS REFERENCE TO RELATED APPLICATIONS

This application is a division of U.S. Nonprovisional patent application Ser. No. 11/944,895, filed Nov. 26, 2007, which claims the benefit of U.S. Provisional Patent Application Ser. No. 60/867,261 filed Nov. 27, 2006. These related applications are fully incorporated herein by reference.

STATEMENT REGARDING FEDERALLY SPONSORED RESEARCH & DEVELOPMENT

The U.S. Government has certain rights in this invention pursuant to National Science Foundation CAREER Award No. DMR-0349078.

BACKGROUND OF THE INVENTION

Surface buckling, or wrinkling, can be generated in a variety of systems that include: 1) thermally or mechanically stressed metallic, polymeric and silicate thin films supported on elastomeric substrates, 2) dried thin films prepared by sol-gel method, as well as 3) soft gels placed under geometric confinement that are swollen or dried. See, e.g., N. Bowden, S. Brittain, A. G. Evans, J. W. Hutchinson and G. W. Whitesides, *Nature*, 1998, vol. 393, pages 146-149; W. T. S. Huck, N. Bowden, P. Onck, T. Pardoen, J. W. Hutchinson and G. W. Whitesides, *Langmuir*, 2000, vol. 16, pages 3497-3501; C. Harrison, C. M. Stafford, W. Zhang and A. Karim, *Applied Physics Letters*, 2004, vol. 85, pages 4016-4018; C. M. Stafford, C. Harrison, K. L. Beers, A. Karim, E. J. Amis, M. R. Vanlandingham, H.-C. Kim, W. Volksen, R. D. Miller and E. E. Simonyi, *Nature Materials*, 2004, vol. 3, pages 545-550; D. B. H. Chua, H. T. Ng and S. F. Y. Li, *Applied Physics Letters*, 2000, vol. 76, pages 721-723; N. Bowden, W. T. S. Huck, K. E. Paul and G. W. Whitesides, *Applied Physics Letters*, 1999, vol. 75, pages 2557-2559; K. Efimenko, M. Rackaitis, E. Manias, A. Vaziri, L. Mahadevan and J. Genzer, *Nature Materials*, 2005, vol. 4, pages 293-297; S. J. Kwon, J.-H. Park and J. G. Park, *Physical Review E*, 2005, vol. 71, pages 11601-11604; R. C. Hayward, B. F. Chmelka and E. J. Kramer, *Macromolecules*, 2005, vol. 38, pages 7768-7783; T. Tanaka, S.-T. Sun, Y. Hirokawa, S. Katayama, J. Kucera, Y. Hirose and T. Amiya, *Nature*, 1987, vol. 325, pages 796-798; E. S. Matsuo and T. Tanaka, *Nature*, 1992, vol. 358, pages 482-484. These surface relief structures are interesting for their pattern complexity as well as ease of formation with a dominant periodicity. Although some mechanisms for global-scale alignment of local wrinkling have been demonstrated, there is a need for surface wrinkling methods that allow global-scale wrinkling alignment with applicability to a range of materials and ease of tuning buckling wavelength and persistence lengths.

BRIEF DESCRIPTION OF THE INVENTION

A surface buckling method that is applicable to a range of materials and allows for global-scale alignment of local wrinkling and ease of tuning buckling wavelength and persistence lengths comprises: modifying a surface of an elastomeric layer to form a superlayer; wherein the elastomeric layer comprises a crosslinked polymer having a first flexural modulus; and wherein the superlayer comprises a modification reaction product having a second flexural modulus greater than the first flexural modulus; swelling the elastomeric layer with a polymerizable monomer, thereby causing buckling of the superlayer; and polymerizing the polymerizable monomer, thereby stabilizing the buckling of the superlayer.

Another embodiment is a method of forming an article comprising a patterned surface, comprising: oxidizing at least a portion of a surface of a polysiloxane layer to form a polysiloxane layer comprising a silicate superlayer; swelling the polysiloxane layer comprising a silicate superlayer with an acrylate monomer, thereby causing buckling of the silicate superlayer; and polymerizing the acrylate monomer, thereby stabilizing the buckling of the silicate superlayer.

Another embodiment is a method of forming an article comprising a buckled surface, comprising: modifying at least a portion of a surface of an elastomeric layer to form a superlayer comprising a modification reaction product; swelling the elastomeric layer with a polymerizable monomer, thereby causing buckling of the superlayer; wherein the polymerizable monomer has a first solubility in the elastomeric layer and a second solubility in the superlayer; and wherein the first solubility is greater than the second solubility; and polymerizing the polymerizable monomer, thereby stabilizing the buckling of the superlayer.

Another embodiment is a method of forming a microlens array, comprising: modifying a surface of an optically transparent elastomeric layer to form a plurality of optically transparent superlayer islands; wherein the elastomeric layer comprises a crosslinked polymer having a first flexural modulus; and wherein the superlayer islands comprise a modification reaction product having a second flexural modulus greater than the first flexural modulus; swelling the elastomeric layer with a polymerizable monomer, thereby causing buckling of the superlayer islands; and polymerizing the polymerizable monomer, thereby stabilizing the buckling of the superlayer islands; wherein each buckled superlayer island independently has a diameter of about 500 nanometers to about 500 micrometers and a radius of curvature such that a ratio of the radius of curvature to the diameter is about 0.5 to about 10.

Another embodiment is a method of forming a compound microlens, comprising: forming a compound microlens blank; wherein the compound microlens blank comprises an optically transparent elastomeric layer having a curved surface characterized by a radius of curvature of about 0.1 to about 10 millimeters; modifying the curved surface of the optically transparent elastomeric layer to form a plurality of optically transparent superlayer islands; wherein the elastomeric layer comprises a crosslinked polymer having a first flexural modulus; and wherein the superlayer islands comprise a modification reaction product having a second flexural modulus greater than the first flexural modulus; swelling the elastomeric layer with a polymerizable monomer, thereby causing buckling of the superlayer islands; and polymerizing the polymerizable monomer, thereby stabilizing the buckling of the superlayer islands; wherein each buckled superlayer island independently has a diameter of about 500 nanometers to about 500 micrometers and a radius of curvature such that a ratio of the radius of curvature to the diameter is about 0.5 to about 10; and wherein a ratio of the radius of curvature of the microlens blank curved surface to the radius of curvature of each buckled superlayer island is about 10 to about 1,000.

Other embodiments include articles formed by the above methods, including microlenses, microlens arrays, compound microlenses, artificial compound eyes comprising microlens arrays and/or compound microlenses, diffraction gratings, photonic crystals, pressure-sensitive adhesives, mechanical strain sensors, microfluidic devices, and cell culture containers.

BRIEF DESCRIPTION OF THE DRAWINGS

FIG. 2a is an optical micrograph of the buckled surface; FIG. 2b has scanning electron micrographs of the same surface at two magnifications;

FIG. 5a consists of micrographs of four buckled surfaces differing in the duration of UV/ozone oxidation; FIG. 5b is a plot of buckling wavelength ($\lambda$) versus UV/ozone oxidation time;

FIGS. 7a and 7b are surface images obtained from optical profilometry of the compound lens; the inset in FIG. 7a shows the overall dimensions of the compound microlens; FIG. 7c shows the cross-sectional dimensions of an individual microlens as determined using a stylus profiler;

FIG. 8a is a diagrammatic illustration of the experimental apparatus; FIG. 8b shows that the individual microlenses are optically functional;

FIG. 9a shows images of the surface patterns obtained after acrylate swelling and crosslinking; FIG. 9b is a phase map summarizing the effects of silicate layer lateral confinement on the resultant wrinkled structures formed.

DETAILED DESCRIPTION OF THE INVENTION

Figure 1:
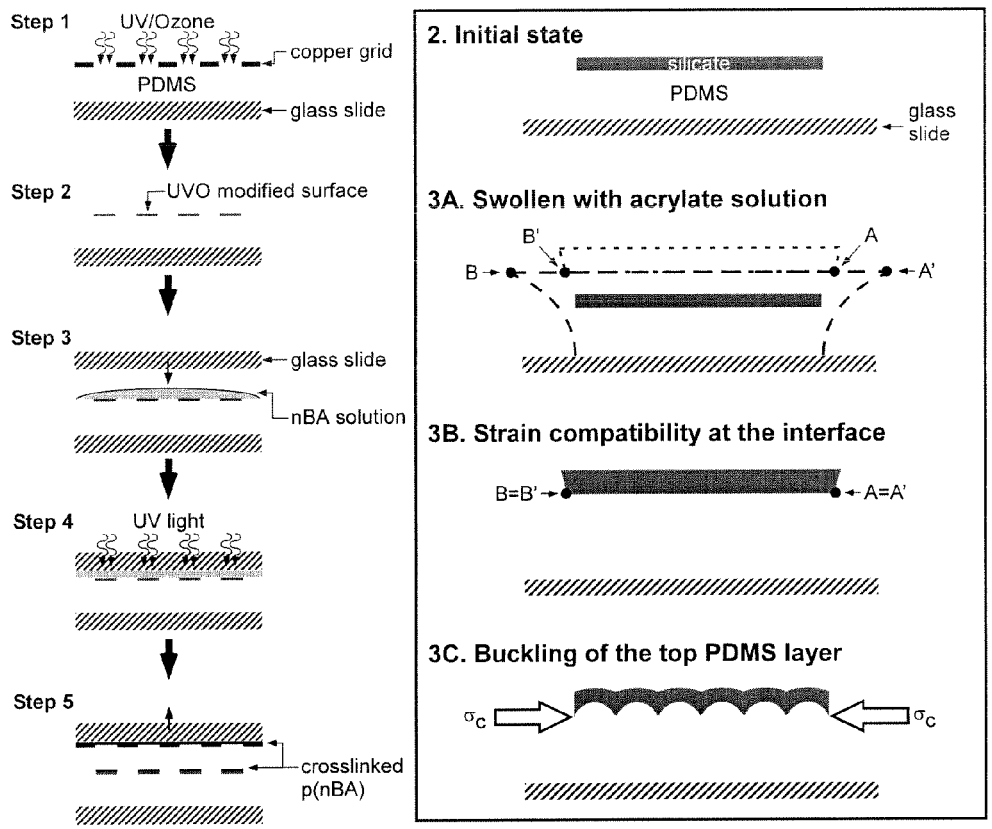
FIG. 1 is a diagrammatic illustration of a method of forming a buckled surface; the left side of the diagram shows the process steps, and the right side shows the physical states of the multilayer structure at various stages.

The present inventors have demonstrated a method for generating spontaneously aligned surface wrinkles via control of local moduli-mismatch and osmotic pressure. The moduli-mismatch is produced by converting selective areas of an elastomer surface into a stiffer material—for example by converting a polysiloxane elastomer to a silicate thin surface layer via a UV/Ozone (UVO) oxidation process. Subsequent swelling of the elastomer with a polymerizable monomer creates an osmotic stress that is relieved by buckling of the elastomer and stiffer surface layer. The shape and dimensions of oxidized regions control the local stress state upon swelling which in turn directs and orients the formation of the wrinkles. This approach is amenable to creating relief patterns on a variety of polymer systems to yield a wide variety of functional articles, including, for example, microlenses, microlens arrays, compound microlenses, artificial compound eyes comprising microlens arrays and/or compound microlenses, diffraction gratings, pressure-sensitive adhesives, mechanical strain sensors, microfluidic devices, photonic crystals, and cell culture containers.

One embodiment is a method of forming a buckled surface, comprising: modifying at least a portion of a surface of an elastomeric layer to form a superlayer; wherein the elastomeric layer comprises a crosslinked polymer having a first flexural modulus; and wherein the superlayer comprises a modification reaction product having a second flexural modulus greater than the first flexural modulus; swelling the elastomeric layer with a polymerizable monomer, thereby causing buckling of the superlayer; and polymerizing the polymerizable monomer, thereby stabilizing the buckling of the superlayer. The percentage of the surface that is modified to form a superlayer may vary from about 1 to 100 area percent of the surface, specifically about 5 to about 90 area percent, more specifically about 10 to about 80 area percent, even more specifically about 20 to about 70 area percent, still more specifically about 40 to about 60 area percent.

When a portion of the elastomeric layer surface is modified, the superlayer may take the form of various shapes. For example, in some embodiments, modifying the surface of the elastomeric layer comprises forming a plurality of superlayer ribbons, each ribbon independently having a width of about 100 nanometers to about 500 micrometers, specifically about 300 nanometers to about 300 micrometers, more specifically about 1 to about 200 micrometers, still more specifically about 5 to about 100 micrometers, even more specifically about 10 to about 80 micrometers, yet more specifically about 20 to about 80 micrometers. The ribbons may or may not be parallel. As another example, in some embodiments, modifying the surface of the elastomeric layer comprises forming a plurality of superlayer islands, each island independently having an equivalent circular diameter of about 100 nanometers to about 500 micrometers, specifically about 300 nanometers to about 300 micrometers, more specifically about 1 to about 200 micrometers, still more specifically about 5 to about 100 micrometers, even more specifically about 10 to about 80 micrometers, yet more specifically about 20 to about 80 micrometers. The superlayer islands may have a variety of shapes, depending on the intended application of the buckled surface. For example, the projected two-dimensional shape parallel to the surface of the islands may be circular, oval, triangular, square, rectangular, hexagonal, or other polygonal shape.

When a portion of the elastomeric layer surface is modified, the unmodified portion of the surface may be protected via masking. For example, the surface may be masked with a copper grid of the type used for transmission electron microscopy. As another example, photolithography may be used to selectively mask the elastomer surface. Both of these techniques are demonstrated in the working examples below. These and other masking techniques offer a convenient means of varying the equivalent circular diameter of the superlayer islands.

The thickness of the modified superlayer may also be controlled. Depending on the elastomer material and the surface modification technique, a superlayer island thickness of about 1 nanometer to about 10 micrometers may be obtained. Specifically, the thickness may be about 2 nanometers to about 1 micrometer, more specifically about 5 to about 300 nanometers, even more specifically about 10 to about 100 nanometers.

The surface modifying technique may be any technique effective to form a superlayer having a greater flexural modulus than the elastomeric layer. Suitable surface modifying techniques include exposing the surface to ultraviolet light, exposing the surface to gamma radiation, exposing the surface to an electron beam, exposing the surface to ozone, exposing the surface to an oxygen plasma, exposing the surface to chemical vapor deposition, and combinations thereof. In some embodiments, modifying the surface of the elastomer layer comprises exposing the surface to ultraviolet light and ozone. Other techniques suitable for surface modification including forming a polymer coating (for example, a paint layer) in contact with the elastomeric layer, depositing a metal film on the elastomeric layer, and polymerizing a second polymerizable monomer in the surface of the elastomeric layer to form an interpenetrated network. When the surface of the elastomeric layer is modified by forming a polymer coating, that coating can be applied using techniques including spraying, solvent casting, spin coating, dip coating, flow coating, film adhering, and the like. In this embodiment, the polymer coating is the superlayer. When surface of the elastomeric layer is modified by depositing a metal film on the elastomeric layer, the metal film can be deposited using techniques including sputtering, electron beam evaporation, and the like. There is no particular limit on the composition of the metal deposited, and illustrative metals include copper, gold, nickel, aluminum, titanium, and chromium. Metal alloys can also be used, as can multiple metal layers. For example, Whitesides et al. has demonstrated the deposition of a 5 nanometer thick titanium layer on polydimethylsiloxane, followed by deposition of a 50 nanometer thick gold layer. See W. T. S. Huck, N. Bowden, P. Onck, T. Pardoen, J. W. Hutchinson, and G. M. Whitesides, *Langmuir*, 2000, volume 16, pages 3497-3501. In the embodiments in which a metal film is deposited, the metal film is the superlayer. When the surface of the elastomeric layer is modified by polymerizing a second polymerizable monomer in the surface of the elastomeric layer to form an interpenetrated network, the formation of the interpenetrated network is distinct from the step of swelling the elastomeric layer with a polymerizable monomer, and swelling sufficient to cause buckling is not required for formation of the interpenetrated network. However, the polymerizable monomers described for use in the swelling step can also be used in the surface modification step. When a second polymerizable monomer is used to form an interpenetrated network, the superlayer is made up of the interpenetrated network and the portion of the elastomeric layer that it interpenetrates. Selection of the surface modifying technique will depend on factors including the identity of the elastomeric layer material and the desired surface dimensions and thickness of the resulting superlayer.

The method allows for the formation of buckled surfaces characterized by a wide range of buckling wavelengths. The buckling wavelength, $\lambda$, may be thought of as the width of a surface wrinkle. In some embodiments, the buckling wavelength is about 100 nanometers to about 500 micrometers, specifically 300 nanometers to about 300 micrometers, more specifically about 1 to about 200 micrometers, even more specifically about 5 to about 100 micrometers, yet more specifically about 10 to about 100 micrometers, still more specifically about 20 to about 80 micrometers. As previously demonstrated, the buckling wavelength is a function of the Young's moduli of the unmodified and modified elastomer materials. See, H. G. Allen, *Analysis and Design of Structural Sandwich Panels*, Pergamon Press, Oxford, 1969.

The method also allows for the formation of buckled surfaces characterized by a wide range of persistence lengths. The persistence length, $\zeta$, may be thought of as the straight-line length of a surface wrinkle (that is, the length of the straight portion of a wrinkle). In some embodiments, the persistence length is about 100 nanometers to about 500 micrometers, specifically 300 nanometers to about 300 micrometers, more specifically about 1 to about 200 micrometers, even more specifically about 5 to about 100 micrometers, yet more specifically about 10 to about 100 micrometers, still more specifically about 20 to about 80 micrometers. The persistence length is a function of the compressive strain between the unmodified and modified elastomer materials, as well as the Young's moduli of these materials.

The buckling mechanism depends on a mismatch in stiffness between the unmodified elastomer material and the modified elastomer material. In some embodiments, the flexural modulus of the unmodified elastomer material (sometimes referred to herein as "the first flexural modulus") is about 1 kilopascal to about 10 megapascals at 25° C., specifically about 10 kilopascals to about 4 megapascals, more specifically about 100 kilopascals to about 1 megapascal. In some embodiments, the flexural modulus of the modified elastomer material (sometimes referred to herein as "the second flexural modulus") is about 100 megapascals to about 10 gigapascals at 25° C., specifically about 300 megapascals to about 7.5 gigapascals, more specifically about 900 megapascals to about 5 gigapascals.

The elastomeric layer comprises a crosslinked polymer. This polymer may comprise chemical (that is, covalent) crosslinks, or physical crosslinks. Suitable crosslinked polymers include, for example, polysiloxanes, poly(alkyl(meth) acrylate)s, poly(conjugated diene)s (including highly entangled poly(conjugated diene)s, such as polybutadiene and polyisoprene), block copolymers of alkenyl aromatic monomers and conjugated dienes (including diblock and triblock copolymer comprising at least one polystyrene block and at least one polybutadiene or polyisoprene block, as well as hydrogenation products thereof), and combinations thereof. As used here, the prefix "(meth)acryl-" includes both "acryl-" and "methacryl-". When the crosslinked polymer is a block copolymer, it may, optionally, be aligned in the elastomeric layer before that layer is surface modified. Techniques for alignment of block copolymers in thin layers are described in, for example, Rachel A. Segalman, "Patterning with block copolymer thin films", *Materials Science and Engineering R: Reviews*, 2005, vol. 48, pages 191-226.

There is no particular limit on the method used to form the elastomeric layer. In some embodiments, the elastomeric layer is formed on a substrate, such as a glass slide. The elastomeric layer may be formed, for example, by casting a polymer composition that subsequently cures (as, for example, with a polysiloxane), by solvent casting a polymer composition, by spin coating, or the like.

In some embodiments, the crosslinked polymer is a polysiloxane. As demonstrated in the working examples below, chemically crosslinked polysiloxanes may be prepared from commercially available materials that comprise oligomers or polymers that consist primarily of dimethyl siloxane repeating units and crosslink via hydrosilylation reactions between silyl hydride functional groups and vinyl silane or vinyl siloxane groups. When the crosslinked polymer is a polysiloxane, it may be conveniently modified via UV/ozone treatment to form a silicate superlayer. See, e.g., K. Efimenko, W. E. Wallace and J. Genzer, *Journal of Colloid and Interface Science*, 2002, vol. 254, pages 306-315; and H. Hillborg, N. Tomczak, A. Olah, H. Schonherr and G. J. Vancso, *Langmuir*, 2004, vol. 20, pages 785-794. Polysiloxanes can also be converted to silicon oxycarbides. See, e.g., the pyrolysis methods in U.S. Pat. No. 5,599,624 to Prochazka.

A variety of crosslinked polymers may be used as elastomeric layer substrates for surface modification via formation of a polymer brush layer. Polymer brush layers and their formation are described in, for example, B. Zhao and W. J. Brittain, *Progress in Polymer Science*, vol. 25, pages 677-

710; and J. Pyun, T. Kowaiewski, and K. Matyjaszewski, *Macromolecular Rapid Communications*, vol. 24, pages 1043-1059.

Once the elastomeric layer has been modified to form a superlayer, it is swollen with a polymerizable monomer. This swelling and the resulting local moduli mismatch between the swollen elastomeric layer and the superlayer result in buckling of the superlayer. The polymerizable monomer may be any monomer capable of swelling the elastomeric layer in sufficient concentration to allow subsequent polymerization. Suitable polymerizable monomers include those comprising an aliphatic carbon-carbon double bond or an aliphatic carbon-carbon triple bond. In some embodiments, the polymerizable monomer is an alkenyl aromatic monomer (such as styrene), an acrylate monomer (such as methyl methacrylate, ethyl acrylate, n-butyl acrylate, and the like), alkenyl ether monomers (such as vinyl ethers and allyl ethers), and combinations thereof. In some embodiments, the polymerizable monomer comprises a crosslinker comprising at least two polymerizable groups per molecule, such as acryloyl groups (including methacryloyl groups), vinyl groups, allyl groups, and the like, and combinations thereof. In some embodiments, the polymerizable monomer comprises n-butyl acrylate and ethylene glycol dimethacrylate. The composition used to swell the elastomeric layer need not consist solely of the polymerizable monomer. For example, a mixture of polymerizable monomer and a solvent can be used. The solvent is preferably miscible with the polymerizable monomer. For example, when the elastomeric layer comprises polydimethylsiloxane and the polymerizable monomer is n-butyl acrylate, the solvent can be acetone, isopropanol, methanol, tetrahydrofuran, dichloromethane, or toluene. When a solvent is present in the swelling composition, it can be intentionally removed (for example, by evaporation) from the elastomeric layer before, during, or after the polymerization step. Alternatively, the solvent can remain in the elastomeric layer.

After the elastomeric layer has been modified to form a superlayer and swollen with a polymerizable monomer, thereby causing buckling of the superlayer, the buckling is stabilized by polymerizing the polymerizable monomers. Suitable polymerization methods include heating the polymerizable monomer (optionally in the presence of a free radical initiator, such as an organic peroxide), exposing the polymerizable monomer to ultraviolet light (optionally in the presence of a photopolymerization initiator or catalyst), exposing the polymerizable monomer to an electron beam, exposing the polymerizable monomer to x-rays, exposing the polymerizable monomer to gamma radiation, and combinations thereof. In some embodiments, polymerizing the polymerizable monomer comprises exposing the polymerizable monomer to ultraviolet light.

In some embodiments, swelling the elastomeric layer with a polymerizable monomer comprises coating the elastomeric layer with the polymerizable monomer and covering the elastomeric layer and the polymerizable monomer with a superstrate. The superstrate may be impermeable to the polymerizable monomer, thereby minimizing human exposure to the polymerizable monomer. The superstrate may also transmit ultraviolet light, thereby facilitating subsequent UV polymerization of the monomer. Suitable superstrate materials include, for example, glass and quartz slides. Use of a superstrate may also facilitate exposure of the buckled surface, because removal of the superstrate may be accompanied by fracturing of polymerized monomer at its interface with the buckled superlayer surface.

One embodiment is a method of forming an article comprising a patterned surface, comprising: oxidizing at least a portion of a surface of a polysiloxane layer to form a polysiloxane layer comprising a silicate superlayer; swelling the polysiloxane layer comprising a silicate superlayer with an acrylate monomer, thereby causing buckling of the silicate superlayer; and polymerizing the acrylate monomer, thereby stabilizing the buckling of the silicate superlayer.

Although the elastomeric layer and the superlayer have thus far been described as differing in their flexural modulus, they may also be described as differing in the extent to which they are swollen by the polymerizable monomer. Thus, one embodiment is a method of forming an article comprising a buckled surface, comprising: modifying at least a portion of a surface of an elastomeric layer to form a superlayer comprising a modification reaction product; swelling the elastomeric layer with a polymerizable monomer, thereby causing buckling of the superlayer; wherein the polymerizable monomer has a first solubility in the elastomeric layer and a second solubility in the superlayer; and wherein the first solubility is greater than the second solubility; and polymerizing the polymerizable monomer, thereby stabilizing the buckling of the superlayer.

Another embodiment is an article comprising a surface formed by any of the above-described methods. Such articles include a microlens, a microlens array, a compound microlens, a diffraction grating, a photonic crystal, a pressure-sensitive adhesive, a mechanical strain sensor, a microfluidic device, and a cell culture container. Diffraction gratings prepared by different techniques are described in, for example, N. Bowden, W. T. S. Huck, K. E. Paul and G. W. Whitesides, *Applied Physics Letters*, 1999, vol. 75, pages 2557-2559. One-dimensional photonic crystals are described in, for example, Stephen G. Johnson, "Photonic Crystals: Periodic Surprises in Electromagnetism", available at http://ab-initio.mit.edu/photons/tutorial/ (last visited Nov. 20, 2006); and S. G. Johnson and J. D. Joannopoulos, *Photonic Crystals: The Road from Theory to Practice* (Kluwer, 2002). Specifically, the one-dimensional wrinkles (ribbons) described herein may create a one-dimensional photonic crystal. Surface structures suitable for use as pressure-sensitive adhesives are described in, for example, A. J. Crosby, M. Hageman and A. Duncan, *Langmuir,* 2005, vol. 21, pages 11738-11743. Mechanical strain sensors are described in, for example, C. M. Stafford, C. M. Harrison, K. L. Beers, A. Karim, E. J. Amis, M. R. Vanlandingham, H.-C. Kim, W. Volksen, R. D. Miller and E. E. Simonyi, *Nature Materials,* 2004, vol. 3, pages 545-550. Microfluidic devices are described in, for example, S. Jeon, V. Malyarchuk, J. O. White and J. A. Rogers, *Nano Letters,* 2005, vol. 5, pages 1351-1356. Cell culture surfaces are described in, for example, C. D. W. Wilkinson, A. S. G. Curtis and J. Crossan, *J. Vac. Sci. Technol. B,* 1998, vol. 16, pages 3132-3136; and M. Yamato, C. Konno, M. Utsumi, A. Kikuchi and T. Okano, *Biomaterials,* 2002, vol. 23, pages 561-567.

One embodiment is a method of forming a microlens array, comprising: modifying a surface of an optically transparent elastomeric layer to form a plurality of optically transparent superlayer islands; wherein the elastomeric layer comprises a crosslinked polymer having a first flexural modulus; and wherein the superlayer islands comprise a modification reaction product having a second flexural modulus greater than the first flexural modulus; swelling the elastomeric layer with a polymerizable monomer, thereby causing buckling of the superlayer islands; and polymerizing the polymerizable monomer, thereby stabilizing the buckling of the superlayer islands; wherein each buckled superlayer island independently has a diameter of about 500 nanometers to about 500 micrometers and a radius of curvature such that a ratio of the radius of curvature to the diameter is about 0.5 to about 10. In some embodiments, the superlayer island diameter may be about 1 micrometer to about 200 micrometers, specifically about 10 micrometers to about 100 micrometers, more specifically about 30 micrometers to about 65 micrometers. In some embodiments, the ratio of the radius of curvature to the diameter is about 1 to about 7.5, specifically about 1 to 5, more specifically about 1 to 3. As used herein, the term "optically transparent" means having a transmittance of at least 90 percent in the wavelength range 450 to 700 nanometers, measured at 25° C. and a path length of 1 millimeter. In some embodiments, the transmittance is at least 95 percent, specifically at least 98 percent. In some embodiments, the microlens has a focal length of about 2 to about 50 millimeters, specifically about 5 to about 20 millimeters, more specifically about 10 millimeters. Other embodiments include a microlens array made by this method, and a compound eye (that is, an artificial compound eye) comprising such a microlens. Methods of forming artificial compound eyes that include microlens arrays are described in, for example, U.S. Patent Application No. 2005/0196068 of Kawai, and U.S. Pat. No. 6,893,941 B2 to Suda, U.S. Pat. No. 7,019,671 B2 to Kawai, and U.S. Pat. No. 6,987,258 B2 to Mates.

Another embodiment is a method of forming a compound microlens, comprising: forming a compound microlens blank; wherein the compound microlens blank comprises an optically transparent elastomeric layer having a curved surface characterized by a radius of curvature of about 0.1 to about 10 millimeters or greater; modifying the curved surface of the optically transparent elastomeric layer to form a plurality of optically transparent superlayer islands; wherein the elastomeric layer comprises a crosslinked polymer having a first flexural modulus; and wherein the superlayer islands comprise a modification reaction product having a second flexural modulus greater than the first flexural modulus; swelling the elastomeric layer with a polymerizable monomer, thereby causing buckling of the superlayer islands; and polymerizing the polymerizable monomer, thereby stabilizing the buckling of the superlayer islands; wherein each buckled superlayer island independently has a diameter of about 500 nanometers to about 500 micrometers and a radius of curvature such that a ratio of the radius of curvature to the diameter is about 0.5 to about 10; and wherein a ratio of the radius of curvature of the microlens blank curved surface to the radius of curvature of each buckled superlayer island is about 10 to about 1,000. In some embodiments, the diameter is about 1 to about 200 micrometers, specifically about 10 to about 100 micrometers, more specifically about 30 to about 65 micrometers. In some embodiments, the ratio of the buckled island radius of curvature to the buckled island diameter is about 1 to about 7.5, specifically about 1 to about 5, more specifically about 1 to about 3. Other embodiments include a compound microlens formed by the method, and a compound eye (that is, an artificial compound eye) comprising such a compound microlens. Methods of forming artificial compound eyes that include compound microlenses are described in, for example, U.S. Patent Application Publication No. US 2006/0236721 A1 of Franck; Ki-Hun Jeon, Jaeyoun Kim, Luke P. Lee, "Biologically Inspired Artificial Compound Eyes", Science, 2006, vol. 312, pages 557-561; and Luke P. Lee and Robert Szema, "Inspirations from Biological Optics for Advanced Photonic Systems", Science, 2005, vol. 310, pages 1148-1150; and references therein.

The invention is further illustrated by the following non-limiting examples.

EXAMPLE 1

This example describes an illustrative general procedure for forming surface buckles.

A crosslinked polysiloxane film is prepared by combining Dow Corning Sylgard 184 silicone elastomer base with Dow Corning Sylgard 184 silicone elastomer curing agent catalyst in a 10:1 weight ratio, casting on a glass substrate, and curing at 110° C. for 1 hour. Sylgard 184 silicone elastomer base is reported by its manufacturer to contain >60 weight percent dimethylvinyl-terminated dimethylsiloxane (Chemical Abstracts Service (CAS) Registry No. 68083-19-2), 30-60 weight percent dimethylvinylated and trimethylated silica (CAS Reg. No. 68988-89-6), and 1-5 weight percent tetra(trimethylsiloxy)silane (CAS Reg. No. 3555-47-3). Sylgard 184 silicone elastomer curing agent is reported by its manufacturer to contain 40-70 weight percent "dimethyl, methylhydrogen siloxane" (CAS Reg. No. 68037-59-2), 15-40 weight percent dimethylvinyl-terminated dimethylsiloxane (CAS Reg. No. 68083-19-2), 10-30 weight percent dimethylvinylated and trimethylated silica (CAS Reg. No. 68988-89-6), and 1-5 weight percent tetramethyl tetravinyl cyclotetrasiloxane (CAS Reg. No. 2554-06-5). The polysiloxane is believed to cure via a catalyzed hydrosilylation reaction between the silyl hydride groups and the vinyl silyl groups.

The cured polysiloxane film is selectively UV/ozone oxidized by masking the surface of the polysiloxane film with a copper grid. The UV/ozone is generated by a Jelight UVO cleaner model 342, Jelight Company Inc., Irvine, Calif. The distance between the polysiloxane film and the UV light source is kept constant at 6 millimeters and an exposure time of about 15 to about 60 minutes is used. The UV/ozone treatment converts the exposed polysiloxane surface to silicate layer. The work of Efimenko et al. suggests that the top surface of the exposed polysiloxane layer is converted to a dense silicate layer with a thickness of about 5 nanometers. See, K. Efimenko, W. E. Wallace, and J. Genzer, *Journal of Colloid and Interface Science*, 2002, volume 254, pages 306-315. The work of Hillborg et al. suggests that ozone diffusion beneath this dense silicate layer results in an intermediate diffuse silicate layer with varying silicate density and a thickness as great as 160 nanometers. See, H. Hillborg, N. Tomczak, A. Olah, H. Schonherr, and G. J. Vancso, *Langmuir*, 2004, volume 20, pages 785-794.

The selectively oxidized polysiloxane film is then swollen with a photocurable acrylate monomer solution. The photocurable acrylate formulation consists of n-butyl acrylate monomer (Sigma-Aldrich; 75 weight percent based on total acrylate), ethylene glycol dimethacrylate crosslinker (Sigma-Aldrich; 25 weight percent based on total acrylate), and commercial photoinitiators Irgacure 184 (Ciba Specialty Chemicals; 1-hydroxycyclohexyl phenyl ketone; CAS Reg. No. 947-19-3; 1 weight percent based on total acrylate) and Irgacure 819 (Ciba Specialty Chemicals; phenyl bis(2,4,6-trimethylbenzoyl) phosphine oxide; CAS Reg. No. 162881-26-7; 1 weight percent based on total acrylate). The monomer and crosslinker are purified by filtering through alumina to remove the inhibitors and then combined with the photoinitiators to yield a clear bright yellow liquid. This solution is deposited onto the selectively oxidized polysiloxane film surface in an amount of about 100 milliliters/meter$^2$ and covered with a glass superstrate to spread the acrylate formulation uniformly across the polysiloxane surface. After allowing the polysiloxane to swell with acrylate formulation for about one minute, the entire assembly is irradiated with ultraviolet light (OAI 500 W DUV, wavelength=365 nanometers, intensity=20 megawatts/centimeter$^2$) for about 6 minutes to photopolymerize and crosslink the acrylate formulation. Finally, the glass superstrate is removed by mechanical peeling to reveal the wrinkled pattern on the polysiloxane surface.

This process is shown diagrammatically in FIG. 1, which also shows the changes in the physical states of the layers. The left side of FIG. 1 illustrates the procedure for creating the buckled pattern: in step 1, a polysiloxane elastomer is selectively UV/ozone oxidized by masking the surface with a copper grid; in step 2, the mask is removed, revealing a surface with alternating areas of polysiloxane elastomer and silicate; in step 3, acrylate solution is deposited onto the newly oxidized surface, which is then covered with a glass slide; in step 4, the entire assembly is irradiated with ultraviolet light; in step 5, removal of the glass superstrate reveals the wrinkles on the oxidized regions. The right side of FIG. 1 illustrates the physical state of the layers at key steps: in step 2, surface areas of polysiloxane exposed to UV/ozone are converted to silicate; at the beginning of step 3 (labeled "3A"), the acrylate monomer swells both the polysiloxane and silicate layers but the softer polysiloxane expands to a greater extent compared with the silicate as depicted hypothetically by points A and A' (or similarly B and B'); as the step 3 swelling continues (labeled "3B"), since the polysiloxane is covalently bound to the stiff silicate layer, expansion of polysiloxane at and near the polysiloxane-silicate interface is laterally confined; strain compatibility boundary conditions at the interface require that A=A' and B=B'; as shown in 3C, this lateral confinement places the swollen polysiloxane into a compressive stress state $\sigma_c$; at a critical $\sigma_c$, the swollen polysiloxane buckles, which in turn buckles the silicate layer. Additional information about the surface buckling process may be found in E. P. Chan and A. J. Crosby, *Soft Matter*, 2006, volume 2, pages 324-328.

EXAMPLE 2

Figure 2:
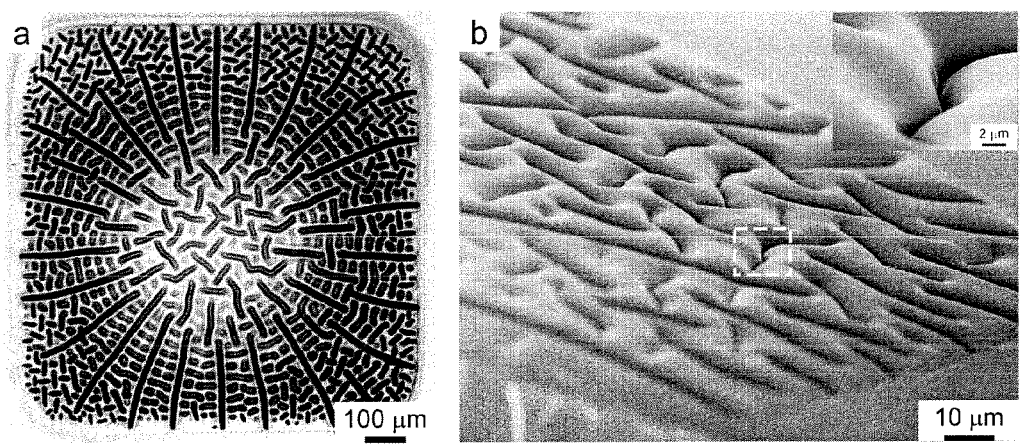
FIG. 2 consists of images of a buckled surface.

This example illustrates the formation of patterned buckling on a 1 millimeter$^2$ section of a polysiloxane film. The general procedure of Example 1, modified as noted below, was used to generate a buckled pattern on a 1 millimeter$^2$ section of a polysiloxane film. A copper grid with 1 millimeter$^2$ openings was used as a mask during the UV/ozone treatment, which lasted for 15 minutes. An optical micrograph of the resulting buckled surface is shown in FIG. 2a, which is a bright field image obtained with a Zeiss Axiovert 200M microscope under reflection mode with a 5× objective and a PIXELFLY CCD camera to record the image. A highly textured, spider-web pattern was formed. A scanning electron micrograph of the same sample is shown in FIG. 2b at two magnifications. The scanning electron micrographs were obtained using a JOEL 6320 FXV FESEM (field emission scanning electron microscope) with an SEI detector. The FIG. 2b micrographs show that the aligned wrinkling pattern consists of cusps that form on the surface. While the length of the grooves varies from 30 to 300 micrometers, the periodicity between neighboring grooves remains uniform at approximately 30 micrometers.

EXAMPLE 3

Figure 3:
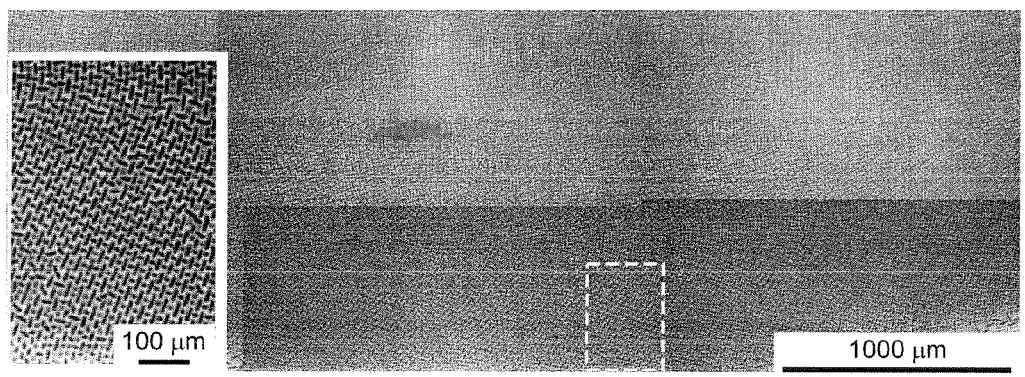
FIG. 3 consists of micrographs at two magnifications illustrating buckling on a 20 centimeter$^2$ section of uniformly UV/ozone-oxidized polysiloxane film.

This example illustrates the formation of patterned buckling on a 20 centimeter section of uniformly UV/ozone-oxidized polysiloxane film. The general procedure of Example 1 was used, except that no mask was employed during the UV/ozone treatment, which lasted 15 minutes. In other words, a silicate surface layer was formed on the entire polysiloxane film. The micrographs in FIG. 3 show that the patterns formed do not resemble the "spider-web" formation of FIG. 2a. Instead, an intricate, intertwined, zipper-pattern develops in this case. Although no attempts were made to induce orientation, local registry of these zipper patterns is observed (see FIG. 3 insert). The mechanism responsible for local registry of the zipper patterns is presently not well understood; however, the generation of the zipper pattern is very reproducible and is observed for multiple samples produced in the same manner.

EXAMPLE 4

This example illustrates alignment of buckling patterns via variation in the dimensions of the UV/ozone treated regions of the polysiloxane film. In other words, surface buckles are oriented via geometrically controlling the moduli-mismatch regions.

This was done by selectively oxidizing a starburst pattern on a polysiloxane film (see FIG. 4a). To do this, the copper grid mask of Examples 1 and 2 with a photoresist thin film. Shipley SPR220 photoresist (MicroChem. Corp.) was spin-coated onto a 1 millimeter thick polysiloxane film at 6000 rotations per minute (rpm) for 60 seconds, pre-baked at 95° C. for 60 seconds, and then exposed with ultraviolet light (OAI 500 W DUV) for 105 seconds through a printed photomask containing the starburst pattern. The film was post-expose baked at 95° C. for 60 seconds and developed for 2 minutes in tetramethyl ammonium hydroxide, which stripped away the exposed resist. This photoresist coated polysiloxane film was then UV/ozone oxidized for 30 minutes. Following cool-down, the remaining photoresist was removed by exposing with ethyl lactate and rinsing with deionized water, and then drying in a vacuum for 2 days until use. Swelling of the film with acrylate monomers and polymerization of those monomers was conducted as described in Example 1.

Figure 4:
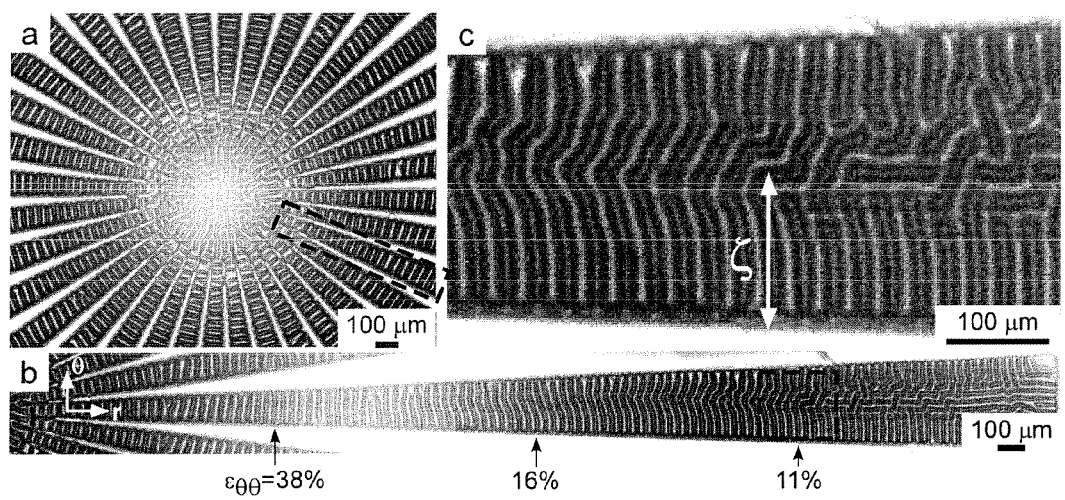
FIG. 4 consists of micrographs at three magnifications for buckling created after UV/ozone oxidation of a polysiloxane film in a starburst pattern.

As FIG. 4 illustrates, the alignment of surface buckles is very sensitive to the shape of the local-moduli mismatch regions. At the center of this "starburst" pattern (FIG. 4a), the surface buckles are randomly oriented since the geometric constraint is not biased. However, by confining the formation of the surface buckles within the oxidized strip (FIG. 4b), alignment is clearly observed. The orientation of the wrinkles persists over a finite length (the persistence length) beyond which the wrinkles become disordered. This persistence length is known to be dependent on the compressive strain of the local region and the modulus-mismatch ratio. See, J. Groenewold, *Physica A*, 2001, volume 298, pages 32-45. Based on an estimated strain of 11% (determined by the change in width prior to monomer swelling and after the buckle formation) and a calculated modulus-mismatch ratio, we calculate a persistence length, $\zeta$, of about 170 micrometers, which is comparable to the measured value of 155 micrometers obtained from FIG. 4c.

EXAMPLE 5

This example illustrates control of buckling wavelength via variation of the silicate layer thickness.

Figure 5:
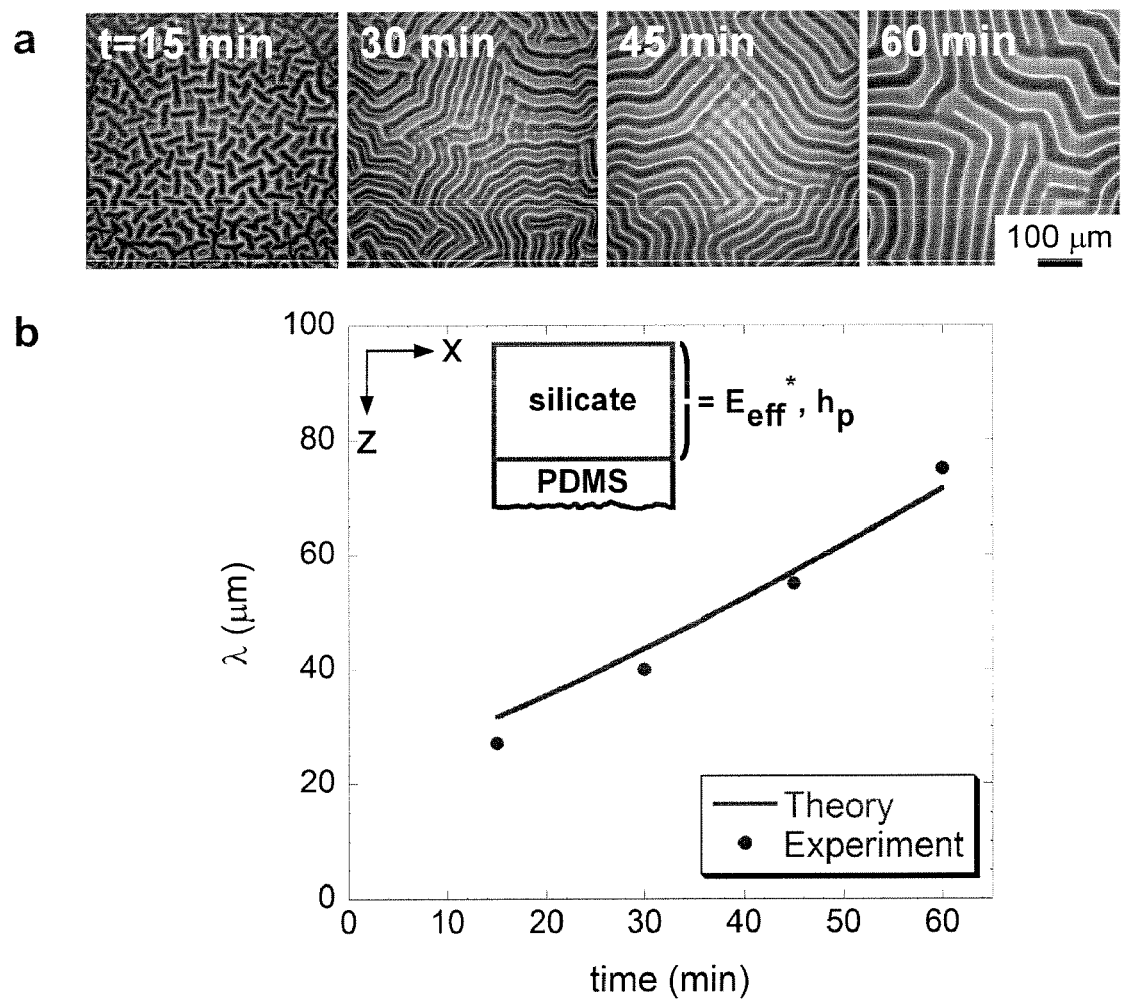
FIG. 5 illustrates the dependence of buckling wavelength and persistence length on the duration of UV/ozone oxidation.

FIG. 5a illustrates the wavelength dependence of the buckling patterns with respect to UV/ozone oxidation times. The wavelength ($\lambda$) increases with oxidation times (t), with wavelengths, $\lambda$, of 27, 40, 55, and 75 micrometers, respectively, for oxidation times of 15, 30, 45, and 60 minutes. A single polysiloxane film with a thickness of 0.88 millimeters was used to generate this gradient. Sections of the film were oxidized in increments of 15 minutes. Afterwards, the entire film was coated with acrylate solution, which was subsequently photopolymerized. FIG. 5b shows the scaling relationship of buckling wavelength, $\lambda$, versus oxidation time. Although the UV/ozone oxidation creates a multilayer silicate film with different elastic modulus and thickness values, we approximated this complex structure with an effective modulus, $E_{eff}*$, and total layer thickness, $h_p$. The solid curve shows the theoretical prediction for λ based on the experimental results from Efimenko et al. for the UV/ozone oxidation of polysiloxane films. See, K. Efimenko, W. E. Wallace, and J. Genzer, *Journal of Colloid and Interface Science*, 2002, volume 254, pages 306-315.

EXAMPLE 6

This example illustrates fabrication of a compound lens using the surface buckling techniques.

Figure 6:
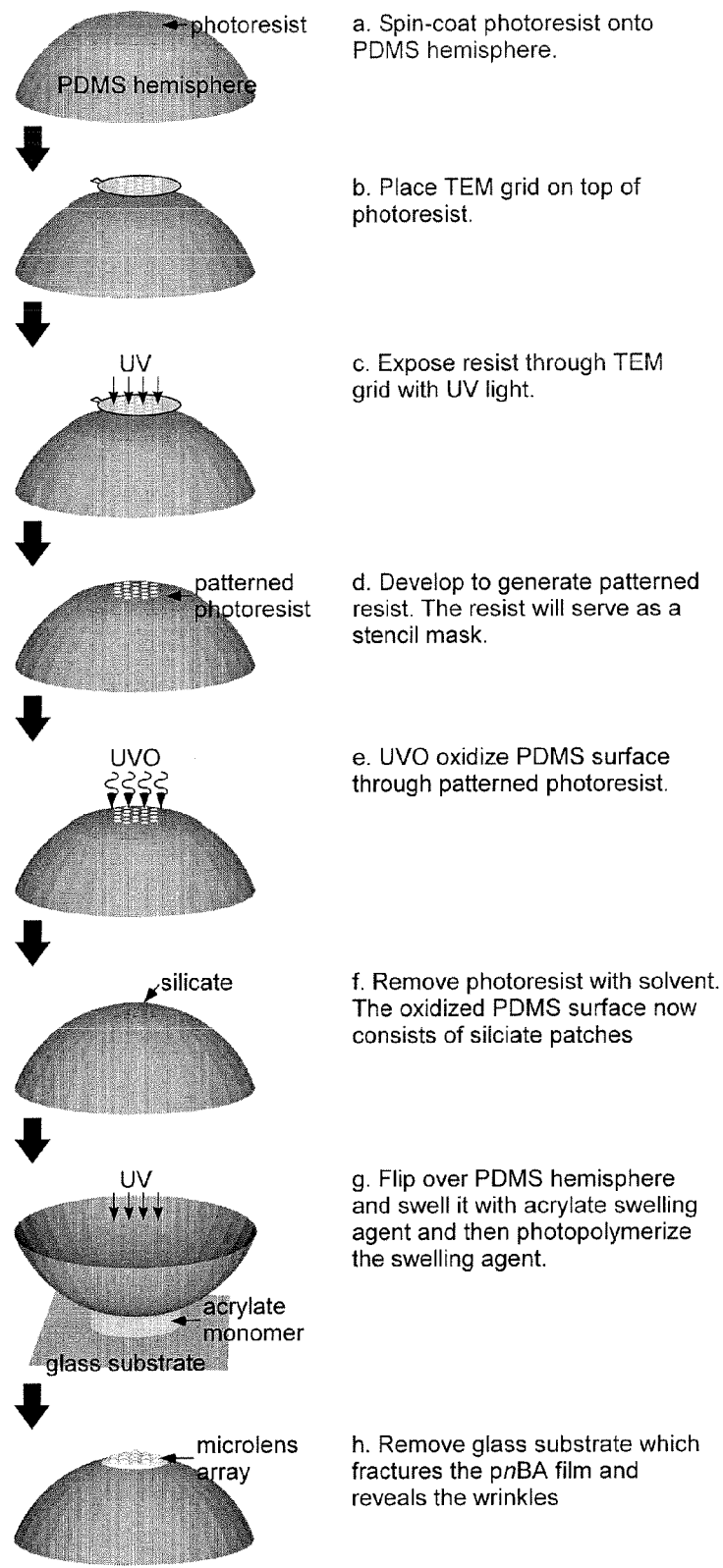
FIG. 6 is a diagrammatic illustration of a method of forming a compound microlens.
Figure 7:
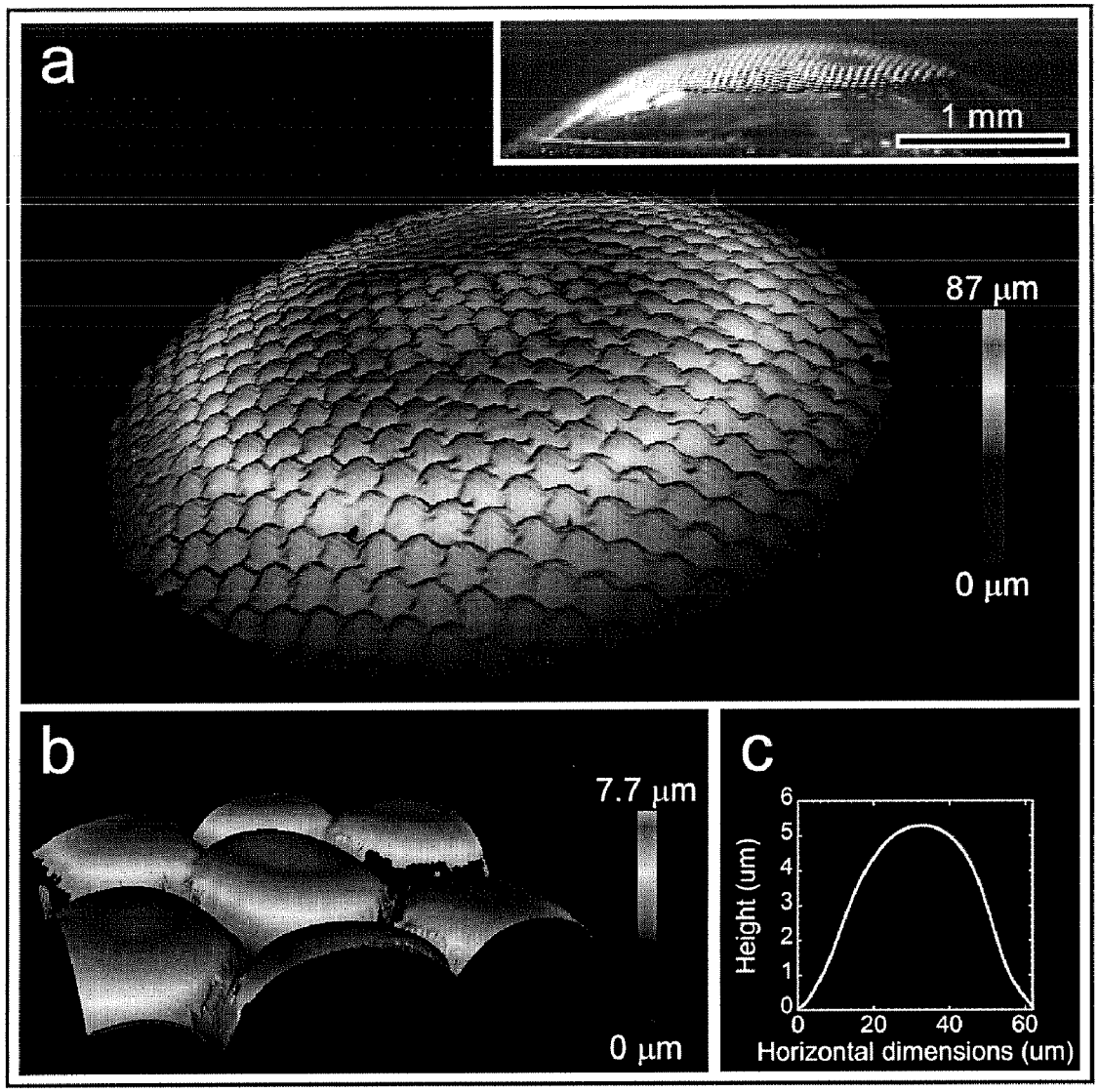
FIG. 7 illustrates the topology of a compound microlens.

The substrate for this experiment was a polysiloxane spherical cap having a radius of curvature of about 2.5 millimeters. It was prepared by casting PDMS in heated water. Because of the difficulty of conforming a copper grid mask to the curved surface of the polysiloxane hemisphere, a patterned photoresist was used. To obtain the high-coverage microlens array shown in FIG. 7, we used the procedure illustrated in FIG. 6. First, we spin coated Shipley SPR220 photoresist (MicroChem. Corp.) onto the hemisphere at 4000 rotations per minute for 60 seconds, pre-baked at 95° C. for 60 seconds, and then exposed the photoresist with ultraviolet light (OAI 500 W DUV, wavelength=365 nm, intensity=20 mJ/cm²) for 45 seconds through a copper transmission electron microscopy (TEM) grid. The copper grid consisted of an array of hexagonal openings with an opening diameter of 40 micrometers and a center-to-center distance between openings of 60 micrometers. The photoresist was post-expose baked at 95° C. for 60 seconds and developed for 2 minutes to strip away the exposed resist. This photoresist-coated hemisphere was then UV/ozone oxidized for 30 minutes. Following cool-down, the remaining photoresist was removed by exposing with ethyl lactate, rinsing with deionized water, and then drying in a 50° C. vacuum oven for 30 minutes. The oxidized (silicate-island-containing) surface of the polysiloxane spherical cap was then swollen with acrylate monomer by inverting the cap (that is, placing it with the planar side up and the silicate-island-containing curved surface down) in a film of acrylate monomer on a glass slide. After allowing the polysiloxane to swell with acrylate monomer for about one minute, the acrylate monomer was crosslinked via ultraviolet light exposure from the planar face of the polysiloxane spherical cap. After acrylate polymerization, the glass substrate was removed, causing fracturing of the polyacrylate layer and revealing the compound lens.

The surface profile of the compound lens was characterized by a Zygo NewView 6000 3D optical profiler (Zygo Corporation, Middlefield, Conn.), using a 50× Mirau objective. FIGS. 7a and 7b show optical profiles of the compound lens. The inset in FIG. 7a shows the overall dimensions of the compound lens. The surface profile of the microlens in the compound lens was also quantified using a stylus profiler. As shown in FIG. 7c, this analysis indicates that an individual microlens has a height of about 5 micrometers and a diameter of about 60 micrometers.

EXAMPLE 7

This example illustrates the lensing properties of a planar microlens array. The planar microlens array was generated using a modified version of the procedure of Example 1, except that the initial polysiloxane layer thickness was 1 millimeter and the UV/ozone treatment was conducted using the copper grid mask described in Example 6.

Figure 8:
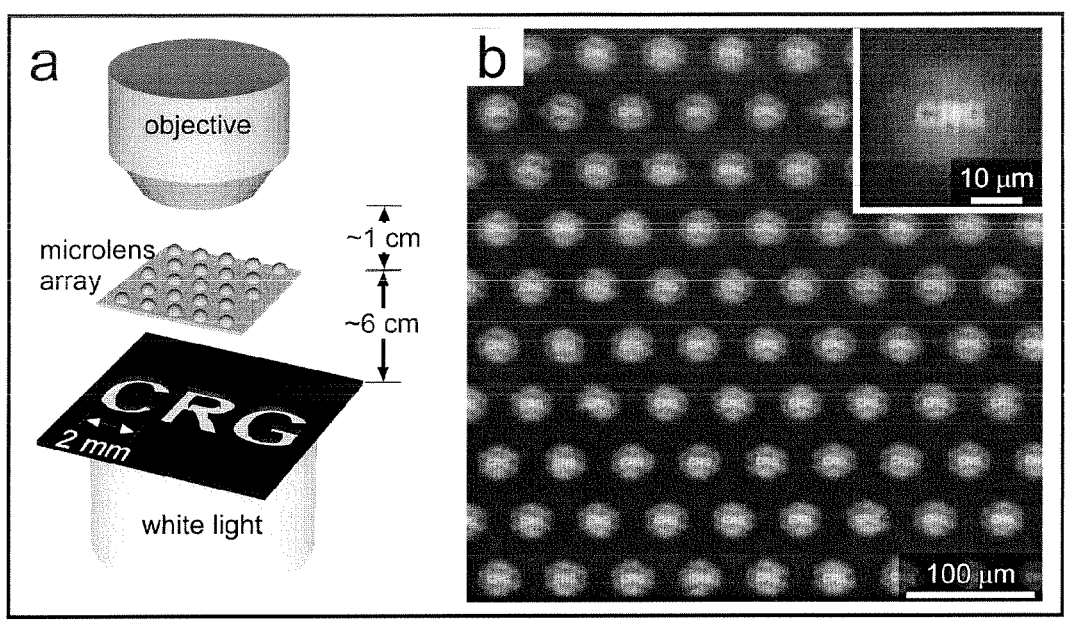
FIG. 8 illustrates the capability of microlenses in a microlens array to be employed as optical elements.

To demonstrate the lensing properties of the resulting microlens, a projection experiment was performed on the planar microlens array (FIG. 8). First, as indicated diagrammatically in FIG. 8a, the microlens array was positioned onto the sample stage of an optical microscope. Next, the microlens array was illuminated with white light from below through a projection template, which was simply a printed transparency with transparent letters CRG. Finally, the miniaturized letters are projected onto the focal plane of the microlens array and imaged through the objective lens of the microscope. As FIG. 8b shows, a hexagonal array of miniaturized CRG letters on the microlens arrays was observed. This experiment illustrates the capability of the microlens arrays to be employed as optical elements.

EXAMPLE 8

This experiment illustrates the creation of a variety of surface structures, including novel dimpled and microlens surface structures, via the control of silicate layer diameter and thickness.

Figure 9:
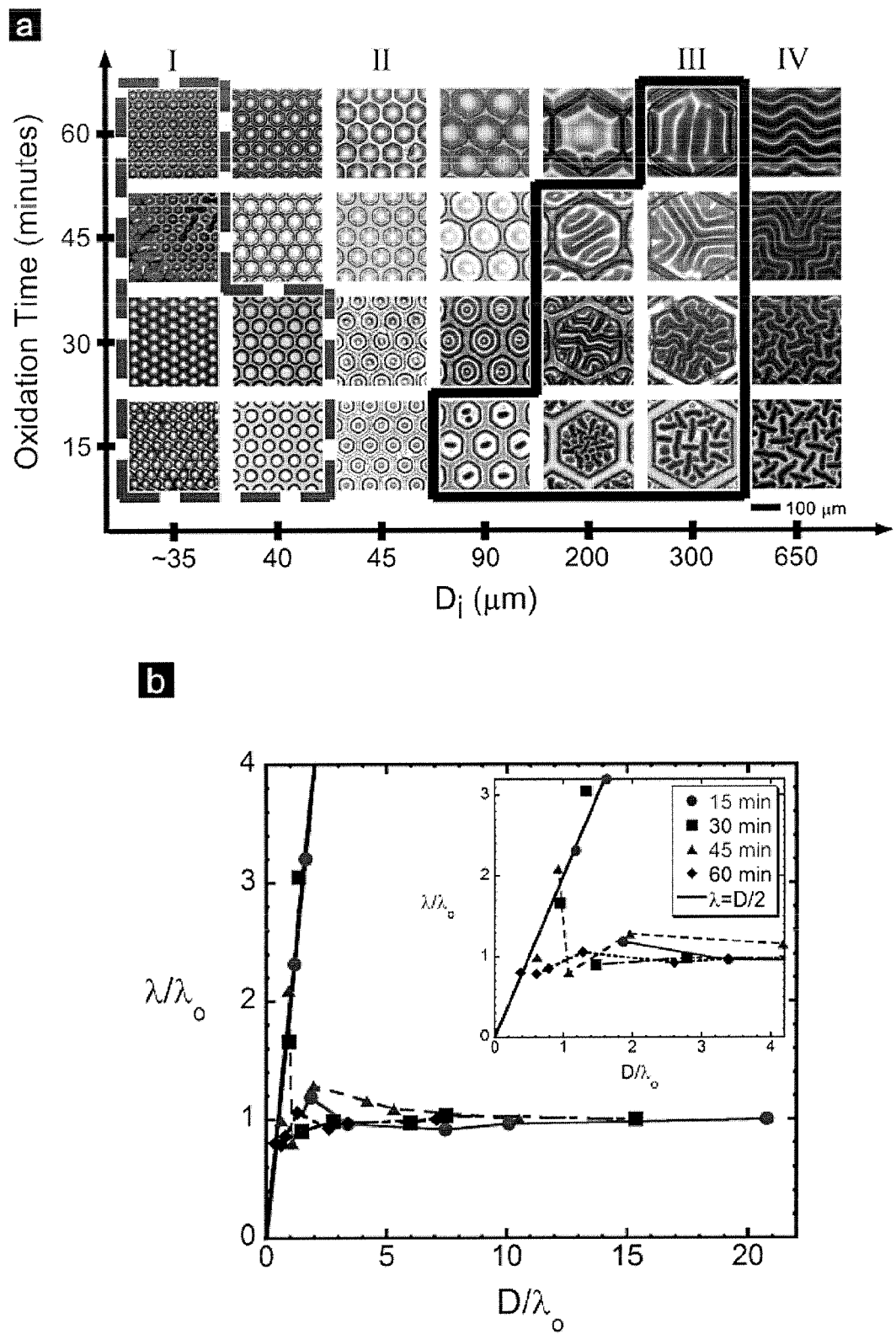
FIG. 9 illustrates control of global surface buckling patterns via variation in superlayer island thickness (controlled via UV/ozone oxidation time) and diameter.

Using a combinatorial approach, we varied both the thickness of the oxidized regions (via variations in UV/ozone oxidation time) and the diameter, $D_i$, of the oxidized regions (via variations in the diameter of hexagonal openings in the copper grid mask) on a planar PDMS surface. The images of the surface patterns obtained after acrylate swelling and crosslinking are presented in FIG. 9a. The patterns fall roughly into four categories. At large oxidized region diameters, corresponding to a nearly semi-infinite case, random 2-D wrinkled patterns are formed (category IV). At low levels of confinement, we again observe the formation of 2-D isotropic wrinkles within the hexagonal areas corresponding to openings in the copper grid mask (category III). However, as $D_i$ further decreases, lateral confinement plays a significant role, and dimpled (category II) and microlens (category I) buckled structures are observed. FIG. 9b is a phase map summarizing the effects of silicate layer lateral confinement on the resultant wrinkled structures formed. The plot demonstrates the role of lateral confinement, as expressed by the ratio $(D/\lambda_o)$, on the resultant buckled structures.

These experiments show that the method provides a simple and rapid means to patterning surfaces with a variety of surface relief structures that include 2-D wrinkles, dimple patterns, and microlens patterns. The degree of lateral confinement as described by the ratio of the superlayer diameter versus the persistence length $(D/\zeta)$ determines the type of wrinkling patterns formed. Low confinement $(D/\zeta>1)$ leads to the formation of 2-D isotropic wrinkles. As the extent of lateral confinement is increased, the finite boundaries play a significant role in the wrinkle formation and lead to the generation of the dimple pattern $(D/\zeta\sim1)$ as well as the microlens structure $(D/\zeta<1)$. The versatility of the method for microlens formation allows for the realization of a variety of functional devices on both planar and non-planar surfaces as demonstrated by the synthetic compound lens structures. Additional information about the formation of microlens arrays, compound lenses, and other relief structures may be found in E. P. Chan and A. J. Crosby, "Fabricating microlens arrays by surface wrinkling", *Advanced Materials*, 2006, volume 18, pages 3238-3242.

In summary, this approach to pattern generation is unique for the spontaneity of relief structure formation and simplicity in attaining pattern alignment. The alignment of the surface patterns is achieved without the aid of a topographic elastomer, rather, oriented patterns are formed by confining the buckling regions with local moduli differences. In general, the process is amenable to a wide range of polymers—different photopolymerizable swelling agents, different elastomers, and different moduli convergence schemes. The general process is amenable to patterning both planar and nonplanar surfaces. Through control of the local stress state of the film—for example, by selective oxidization of the polysiloxane—it is possible to fabricate complex buckling patterns.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:

1. A method of forming a microlens array, comprising:
    modifying a surface of an optically transparent elastomeric layer to form a plurality of optically transparent superlayer islands; wherein the elastomeric layer comprises a crosslinked polymer having a first flexural modulus; and wherein the superlayer islands comprise a modification reaction product having a second flexural modulus greater than the first flexural modulus;
    swelling the elastomeric layer with a polymerizable monomer, thereby causing buckling of the superlayer islands; and
    polymerizing the polymerizable monomer, thereby stabilizing the buckling of the superlayer islands;
    wherein each buckled superlayer island independently has a diameter of about 500 nanometers to about 500 micrometers and a radius of curvature such that a ratio of the radius of curvature to the diameter is about 0.5 to about 10.

2. The method of claim 1, wherein the modifying a surface of an optically transparent elastomeric layer comprises
    using a technique selected from the group consisting of exposing the surface to ultraviolet light, exposing the surface to gamma radiation, exposing the surface to an electron beam, exposing the surface to ozone, exposing the surface to an oxygen plasma, exposing the surface to chemical vapor deposition, and combinations thereof, or
    exposing the surface to ultraviolet light and ozone, or
    using a technique selected from the group consisting of forming a polymer coating in contact with the elastomeric layer, depositing a metal film on the elastomeric layer, and polymerizing a second polymerizable monomer in the surface of the elastomeric layer to form an interpenetrated network.

3. The method of claim 1, wherein the modifying a surface of an optically transparent elastomeric layer comprises using a technique selected from the group consisting of exposing the surface to ultraviolet light, exposing the surface to gamma radiation, exposing the surface to an electron beam, exposing the surface to ozone, exposing the surface to an oxygen plasma, exposing the surface to chemical vapor deposition, and combinations thereof.

4. The method of claim 1, wherein the modifying a surface of an optically transparent elastomeric layer comprises exposing the surface to ultraviolet light and ozone.

5. The method of claim 1, wherein the modifying a surface of an optically transparent elastomeric layer comprises using a technique selected from the group consisting of forming a polymer coating in contact with the elastomeric layer, depositing a metal film on the elastomeric layer, and polymerizing a second polymerizable monomer in the surface of the elastomeric layer to form an interpenetrated network.

6. The method of claim 1, wherein each superlayer island has a diameter of about 30 to about 65 micrometers and a radius of curvature such that a ratio of the radius of curvature to the diameter is about 1 to about 3.

7. The method of claim 1, wherein the crosslinked polymer is a polysiloxane.

8. The method of claim 1, wherein the crosslinked polymer is a polysiloxane, and wherein the modification reaction product comprises a silicate.

9. A microlens array formed by the method of claim 1.

10. A compound eye comprising the microlens array of claim 9.

* * * * *